United States Patent [19]

Wasa et al.

[11] 3,766,041

[45] Oct. 16, 1973

[54] METHOD OF PRODUCING PIEZOELECTRIC THIN FILMS BY CATHODIC SPUTTERING

[75] Inventors: Kiyotaka Wasa, Nara-shi, Nara-ken; Shigeru Hayakawa, Hirakata-shi, Osaka-fu, both of Japan

[73] Assignee: Matsushita Electric Industrial Co., Ltd., Osaka, Japan

[22] Filed: Sept. 17, 1971

[21] Appl. No.: 181,535

[30] Foreign Application Priority Data

Sept. 29, 1970 Japan ............................... 45/86013

Oct. 6, 1970 Japan ............................... 45/88552

[52] U.S. Cl. ................ 204/192, 252/62.9, 117/211, 117/227

[51] Int. Cl. ............................................ C23c 15/00

[58] Field of Search .................... 204/192; 252/62.9; 117/211, 227

[56] References Cited

UNITED STATES PATENTS

| | | | |
|---|---|---|---|
| 3,458,426 | 7/1969 | Rausch et al. | 204/298 |
| 2,505,370 | 4/1950 | Sykes | 204/192 |
| 3,409,464 | 11/1968 | Shiozawa | 252/62.9 |
| 3,484,376 | 12/1969 | Paris et al. | 252/62.2 |

*Primary Examiner*—John H. Mack

*Assistant Examiner*—Sidney S. Kanter

*Attorney*—E. F. Wenderoth et al.

[57] ABSTRACT

An improved method of making piezoelectric thin films comprising zinc oxide having a hexagonal crystalline form by using a cathodic sputtering step capable of controlling the direction of crystallographic orientation in said piezoelectric thin films, characterized in that said cathodic sputtering step comprises co-sputtering of copper or aluminum with zinc in an oxidizing atmosphere.

4 Claims, 3 Drawing Figures

INVENTORS
KIYOTAKA WASA
SHIGERU HAYAKAWA

BY Wenderoth, Lind & Ponack
ATTORNEYS

INVENTORS
KIYOTAKA WASA
SHIGERU HAYAKAWA

BY Wenderoth, Lind & Ponack
ATTORNEYS

METHOD OF PRODUCING PIEZOELECTRIC THIN FILMS BY CATHODIC SPUTTERING

BACKGROUND OF THE INVENTION

1. Field of the Invention

The present invention relates to an improved method of making piezoelectric thin films. More particularly, it relates to a method of making piezoelectric thin films comprising zinc oxide by using a cathodic sputtering step for manufacturing high-frequency ultrasonic transducers.

2. Description of the Prior Art

Hypersonic waves, $10^8$ to $10^{10}$ cps, in dielectric materials have been generated by direct surface excitation of quartz, conventional quartz transducers with high harmonics, or magnetostrictive films. A more convenient and efficient technique for generation of either compressional or shear waves in the gigacycle range is provided by the use of thin film piezoelectric transducers. The small thickness of a film makes it possible to obtain a high fundamental resonant frequency. Active films of cadmium sulphide as thick as $8\mu$ and as thin as 300A have been used to provide fundamental resonant frequencies of about 250Mc/sec and 75Gc/sec, respectively, as described in "Thin Film Phenomena," edited by K.L.Chopra, p447, McGraw-Hill Inc., N.Y., 1969.

Piezoelectric films of vacuum-evaporated hexagonal cadmium sulphide, hexagonal and cubic zinc sulphide, and sputtered as well as evaporated hexagonal zinc oxide have been investigated for use as transducers. Among these active films, zinc oxide film is potentially a better piezoelectric material because of its high electromechanical coupling coefficient. The deposition techniques and crystallographic structures of the zinc oxide films have been studied by various investigators. In particular, a method for controlling the crystallographic orientation of the zinc oxide films has received considerable attention since the mode of generation of sound depends on the crystallographic orientation of the zinc oxide films with respect to the electric field applied for excitation. However, zinc oxide films are are mostly deposited on an amorphous substrate when making the high-frequency ultrasonic transducers and hence the direction of the crystallograpnic orientation of the zinc oxide films can not be controlled very well.

The present invention provides radical improvements in the method of making zinc oxide films on an amorphous substrate in which the direction of crystallographic orientation can be controlled very well. Those skilled in the art will recognize that this novel method is indispensable to the manufacturing of the high-frequency ultrasonic transducers.

SUMMARY OF THE INVENTION

It is an object of the present invention to provide a novel method of making zinc oxide piezoelectric thin films by using a cathodic sputtering step with which the crystallographic orientation can be well controlled.

Another object of the present invention is to provide an improved method of making high-frequency ultrasonic transducers.

These objects are accomplished in the method of the present invention by using a cathodic sputtering step characterized in that said cathodic sputtering step comprises co-sputtering of copper or aluminum with zinc in an oxidizing atmosphere.

DESCRIPTION OF THE PREFERRED EMBODIMENT

The method of making piezoelectric thin films in accordance with the present invention includes a cathodic sputtering step comprising co-sputtering of copper or aluminum with zinc in an oxidizing atmosphere.

Figure 1:
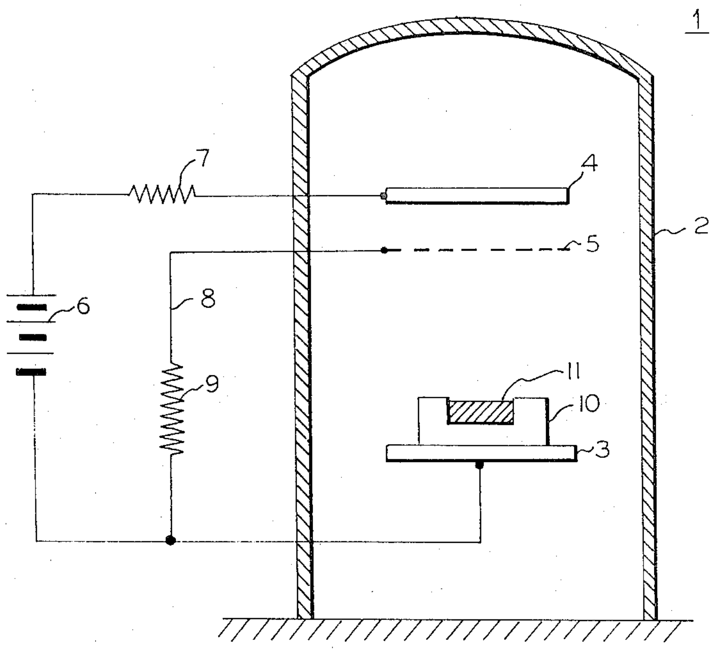
FIG. 1 is a diagrammatic view of the sputtering apparatus which is used in the method of making piezoelectric thin films in accordance with the present invention.

Referring to FIG.1, the sputtering apparatus 1 which is used in the method of making piezoelectric thin films in accordance with the present invention comprises a bell jar 2, a planar anode 3, a planar main cathode 4 and an auxiliary cathode 5 which is positioned between said planar anode and said main cathode. The anode is made from conductive materials having a high melting point. The surface of the main cathode is covered by the zinc metal. The axiliary cathode is made from a planar screen composed of copper wire or aluminum wire having a diameter of 0.1 to 1 mm and openings of 1 to $10mm^2$. The bell jar 2 contains an ionizable medium. This ionizable medium can be a mixture of argon and oxygen, at a pressure ranging from $10^{-2}$ to $10^{-1}$ Torrs. A high voltage source 6 is connected in series to a stabilizing resistor 7 and across the anode 3 and the main cathode 4. An auxiliary circuit 8 comprises an auxiliary circuit resistor 9. A substrate holder 10 to which the substrate can be secured is positioned on the anode 3. Said substrate is kept at temperature ranging from 100° to 300°C.

Figure 2:
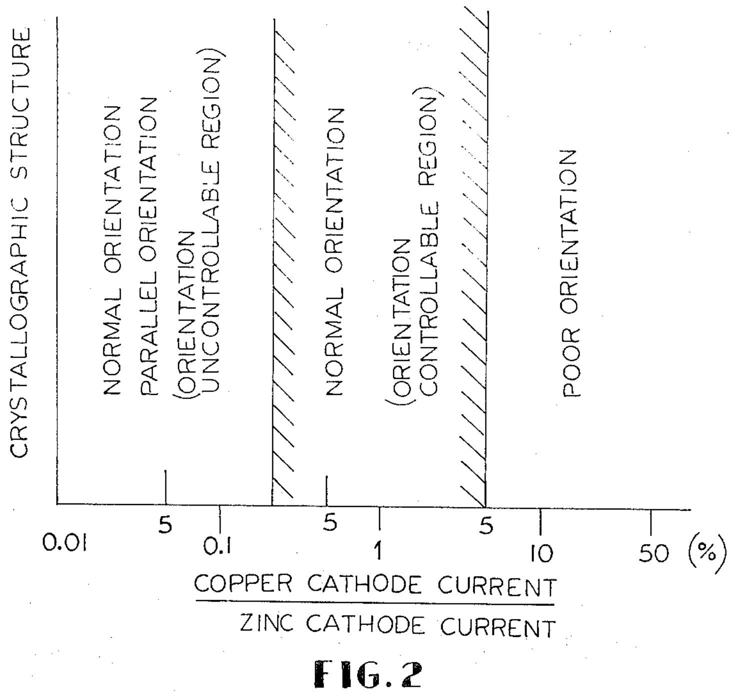
FIGS. 2 and 3 are diagrams showing the effects of copper and aluminum on the crystallographic structure of zinc oxide films, respectively, made in accordance with the present invention.

It has been discovered according to the present invention that the direction of the crystallographic orientation of zinc oxide films having a fiber texture deposited on the amorphous substrate can be well controlled by the co-sputtering of copper from said auxiliary cathode with zinc from said main cathode in an oxidizing atmosphere and with a sputtering current in said auxiliary cathode ranging from 0.3 to 5 percent of the sputtering current in said main cathode as shown in FIG. 2. Referring to FIG. 2, the orientation of zinc oxide films having a fiber texture deposited on the amorphous substrates varies with the sputtering current in said auxiliary copper cathode and zinc oxide films with a c-axis perpendicular to the film surface (normal orientation) can be made with high high reproductibility when said auxiliary cathode currents range from 0.3 to 5 percent of said main cathode currents. Below 0.3 percent the resultant zinc oxide films have either normal orientation or a parallel orientation (c-axis lies in the film) depending on the uncontrollable factors during sputtering process. Above 5 percent the resultant zinc oxide films have poor orientation. Therefore keeping the sputtering current in the auxiliary copper cathode between 0.3 to 5 percent of the main sputtering current is found to be useful for producing normally orientated zinc oxide films having a fiber structure.

Figure 3:
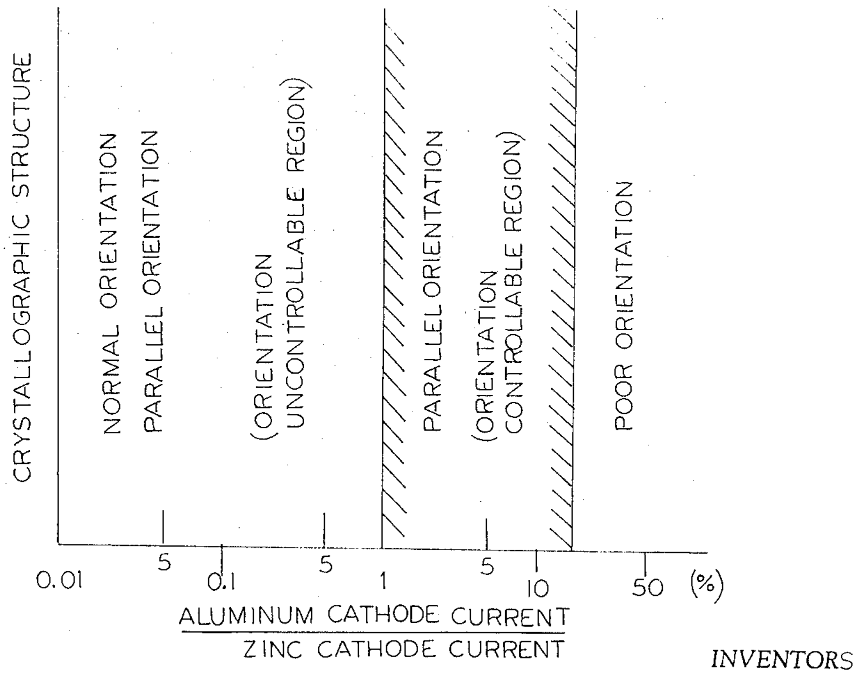

It has also been discovered according to the present invention that the direction of the crystallographic orientation of zinc oxide films having a fiber texture deposited on the amorphous substrate can be well controlled by the co-sputtering of aluminum from said auxiliary cathode with zinc from said main cathode in an oxidizing atmosphere at a sputtering current in said auxiliary cathode ranging from 1 to 20 percent of the sputtering current in said main cathode, as shown in FIG. 3. Referring to FIG. 3, the orientation of zinc oxide films having a fiber texture deposited on the amorphous substrates varies with the sputtering current in said auxiliary aluminum cathode and zinc films with parallel orientation can be made with high reproducibility when said auxiliary cathode currents range from 1 to 20 percent of said main cathode currents. Below 1 percent the resultant zinc oxide films either have normal orientation or parallel orientation depending on the uncontrollable factors during the sputtering process. Above 20 percent the resultant zinc oxide films have poor orientation. Therefore keeping the sputtering current in the auxiliary aluminum cathode between 1 to 20 percent of the main sputtering current is found to be useful for producing parallelly orientated zinc oxide films having a fiber texture.

It has also been discovered according to the present invention that after making thin film piezoelectric materials comprising zinc oxide by a co-sputtering step characterized by co-sputtering an auxiliary copper cathode with a main zinc cathode in an oxidizing atmosphere with a sputtering current in said copper cathode which is 0.3 to 5 percent of the sputtering current in said zinc cathode, high efficiency ultrasonic transducers which generate compressional waves can be made by sandwiching such thin film piezoelectric materials between metal electrodes and cementing the resulting assembly to a solid medium, for example a quartz rod.

It has also been discovered according to the present invention that after making thin film piezoelectric materials comprising zinc oxide by a co-sputtering step characterized by co-sputtering an auxiliary aluminum cathode with a main zinc cathode in an oxidizing atmosphere with a sputtering current in said aluminum cathode which is 1 to 20 percent of the sputtering current in said zinc cathode, high efficiency ultrasonic transducers which generate shear waves can be made by sandwiching thin film piezoelectric materials between metal electrodes and cementing the resulting assembly to a solid medium, for example a quartz rod.

The co-sputtering step described hereinafter can also be conducted by using a composite cathode of copper and zinc or aluminum and zinc. An alloy of copper-zinc and aluminum-zinc can also be used for the cathode.

The effects of the copper and aluminum on the crystallographic orientation are observed over a wide range of pressures of the sputtering gas, i.e., from $10^{-1}$ to $10^{-4}$ Torr although the concentration of the copper or aluminum varies with the sputtering gas pressure, and hence the cathodic sputtering step described hereinbefore can also be conducted by using any sputtering system, such as a radio-frequency sputtering system, or a magnetron type low gas pressure system.

The effects of the copper and aluminum on the orientation may not be caused by substitution, but may be caused by the presence of copper oxides or aluminum oxides at the crystal boundaries of zinc oxide having the fiber texture. Localization of the fine crystallites of aluminum oxide reduces the surface mobility of the zinc oxide particles in substrates which may result in very small crystallites. This may inhibit the growth of the normal orientation. In contrast to the aluminum, the copper enhances the growth of the crystallites and hence enhances the growth of the normal orientation.

The concentrations of the copper in the sputtered zinc oxide films having normal orientation produced by the co-sputtering step according to the present invention range from 1 to 15 atomic percent for an auxiliary copper cathode current of 0.3 to 5 percent. The concentrations of the aluminum in the sputtered zinc oxide films having the parallel orientation produced by the co-sputtering step according to the present invention range from 0.7 to 13 atomic percent for an auxiliary aluminum cathode current of 1 to 20 percent. These concentrations are hardly dependent on the nature of the sputtering system. Therefore any deposition method can be used for the orientation controlled deposition of zinc oxide thin films, if the 1 to 15 atomic percent copper or 0.7 to 13 atomic percent aluminum can be codeposited in an oxidizing atmosphere during film growth of zinc oxides.

It is thought that the invention and its advantages will be understood from the foregoing description.

We claim:

1. A method of making a thin film transducer for use in a high-frequency ultrasonic range, comprising making a thin hexagonal zinc oxide piezoelectric film with a c-axis perpendicular to the film surface containing from 1 to 15 atomic percent copper on an amorphous substrate by carrying out a cathodic sputtering step in an oxidizing atmosphere at a pressure of from $10^{-1}$ to $10^{-4}$ Torr, in a cathodic sputtering apparatus having a main cathode of zinc, an anode of conductive material having a high melting point and adapted to have a substrate secured to it and an auxiliary cathode of copper positioned between said main cathode and said anode, and supplying a sputtering current to said auxiliary cathode which ranges from 0.3 to 5 percent of the sputtering current supplied to the main cathode, sandwiching the thin piezoelectric film between metal electrodes, and cementing the resulting assembly to a solid medium which generates compressional waves.

2. A method of making a thin film transducer as claimed in claim 1 in which said solid medium is a quartz rod.

3. A method of making a thin film transducer for use in a high frequency ultrasonic range, comprising making a thin hexagonal zinc oxide piezoelectric film with a c-axis parallel to the film surface containing from .7 to 13 atomic percent aluminum on an amorphous substrate by carrying out a cathodic sputtering step in an oxidizing atmosphere ranging from $10^{-1}$ to $10^{-4}$ Torr, apparatus having a main cathode of zinc, an anode of conductive material having a high melting point and adapted to have a substrate secured to it and an auxiliary cathode of aluminum positioned between said main cathode and said anode, and supplying a sputtering current to said auxiliary cathode which ranges from 1 to 20 percent of the sputtering current supplied to the main cathode, sandwiching the thin piezoelectric film between metal electrodes, and cementing the resulting assembly to a solid medium which generates shear waves.

4. A method of making a thin film transducer as claimed in claim 3 in which said solid medium is a quartz rod.

* * * * *